Patented Dec. 26, 1939

2,184,957

UNITED STATES PATENT OFFICE 2,184,957

METHOD OF POLYMERIZATION WITH BORON FLUORIDE

Anthony H. Gleason and Raphael Rosen, Elizabeth, N. J., assignors to Standard Oil Development Company, a corporation of Delaware No Drawing. Application September 14, 1935, Serial No. 40,625

14 Claims. (Cl. 87—9)

The present invention relates to an improved method for polymerizing fatty oils and more specifically to a method for producing high grade fatty oil polymers of excellent properties for use in lubricating compositions such as lubricating oils and greases. The invention will be fully understood from the following description.

Fatty oils such as linseed and tung, which belong to the drying class, have been previously polymerized by means of heat at moderate temperatures. The polymers produced in this way are of fairly good color and have been used in the paint and varnish trade. Those polymers produced from the drying oils are not useful for lubricants because they are insoluble and gel in use. It is highly desirable to produce polymerized oils of good color suitable for use in lubricating compositions but the polymerization of semi-drying oil accomplished by heating alone yields material which is dark in color because a high temperature is required and for this reason its use for these purposes has been considerably restricted. In the present invention methods have been found for producing polymers from semi-drying oils for the manufacture of lubricating compositions which are of excellent color.

It has been found that fatty oils of the semi-drying class may be readily polymerized at quite low temperatures, of the order of room temperature, by means of catalysts of the active halide type, in particular aluminum chloride, boron fluoride and the like. These particular substances cause the polymerization of fatty oil at such a rate that it may be readily controlled so as to obtain oils which are extremely useful for the purpose at hand. It has been found necessary in the polymerization of these oils with catalysts to use diluents for the fatty oil during polymerization, so as to obtain uniform polymerization and to prevent undue local reaction. If a diluent is not used, it is found that there is a considerable tendency to over-polymerize a portion of the oil so as to cause gelling and the formation of rubbery oil insoluble substances. For the present purposes it is desired to produce more uniform polymers of high molecular weight range, which are soluble in mineral oils used for lubricating purposes. The use of a thinner or diluent makes it possible to obtain a relatively uniform polymerization rate, which can be controlled accurately so as to produce a much higher average molecular weight and to avoid gel or rubber formation.

As indicated above the oils of the semi-drying class are the preferred raw materials for polymerization, this including oils having iodine numbers ranging from 10 or preferably 50 to 120. The best oil found is rape-seed oil but the other oils of its class are also excellent such as the mustardseed oils. Mixtures may be made up to approximate these oils and they are quite satisfactory, using cottonseed oil, but the above is inferior to rapeseed because the former has too large a content of linoleic acid, and polymers become insoluble at lower molecular weights.

As to the various solvents that have been used it has been found that halogenated hydrocarbons are the best for the present purposes, and among these chlorinated aliphatic hydrocarbons are quite desirable, such as chlorinated gasoline or kerosene, or the chlorinated gaseous hydrocarbons such as dichlor or trichlor ethylene. These latter are considerably more advantageous than carbon tetrachloride, for example. Halogenated aromatics may also be used such as the chlor benzols, chlor toluols and xylols, although again it is preferred to use chlorinated ethylene and propylene.

The amount of the solvent used may vary considerably with the particular type of solvent and also the type of oil to be polymerized. With more viscous oils it is found desirable to increase the amount of the solvent but for general purposes a fatty oil should be diluted with about an equal quantity of the solvent material.

The temperature for polymerization is in general about room temperature although it may be somewhat lower or somewhat higher. The time of reaction is such as to produce the type of polymers desired in the particular operation. It depends upon the particular oil for one thing, the more unsaturated oils showing a greater rapidity of reaction than the less unsaturated oils.

Reaction time also depends on the amount and particular catalysts used. Boron fluoride is of particular value and the amount may vary from say 2% up to as much as 15 or 20%. In general, however, the time will vary, with the various conditions as indicated above, widely within the limits of 12 to about 100 hours, and the particular weight polymers desired may be controlled by adjusting the time of reaction.

The reaction may be carried out in many different ways, for example, it may be carried out in batch, filling a vessel for example with the diluted fatty oil and the desired amount of catalyst, and agitating for the proper reaction time. If boron fluoride is used it is preferred to blow it through in a gaseous state, and after reaction the catalyst is removed, for example, by washing with alkali which hydrolizes the halide. It may then be washed out with water.

The products have viscosities in excess of about 1,000 seconds Saybolt at 210° F., and if desired, considerably higher, say 3,000 to 10,000 seconds. Drying oil polymers will continue to dry and are insoluble in lubricating oils and for these reasons are of little use in lubricating compositions, but those obtained from semi-drying oils show little or no drying, the iodine number decreasing steadily as reaction progresses so as to be much lower for the polymer than the initial oil; for example, as little as one-half or one-quarter of the initial value or even lower. The saponification number ordinarily does not change. The polymers are quite soluble if molecular weight is not too high, and they are extremely useful ingredients for compounding lubricating oils and greases.

The viscosity and viscosity index of a mineral lubricating oil are raised by the addition of the polymer. The product also endows the oil with superior oiliness.

The polymers, especially those of the higher molecular weight range say above 5,000, are pour inhibitors for waxy oils and are in many cases more effective in heavy than in light oils. About 2% is desirable for pour inhibiting.

These same polymers are effective wax separation aids as well, causing rapid separation of wax from diluted oils and permitting extremely rapid chilling of the waxy oils.

In order to illustrate the use of solvents and the results obtained, the following examples are given.

*Example I*

Using rapeseed oil with an original viscosity of 60 seconds Saybolt at 210° F. and an equal volume of solvent, the following results were obtained with naphtha and with ethylene dichloride as solvents. The boron fluoride was bubbled through the diluted mixture while at about 25° C. The increase in weight indicated the amount of catalyst absorbed. After the run the catalyst was hydrolized and removed with water.

| Solvent | Boron fluoride | Time of reaction | Saybolt viscosity of product at 210° F. |
|---|---|---|---|
| | Percent | Hours | |
| Naphtha | 22 | 96 | 338 |
| Ethylene dichloride | 18 | 24 | 9,500 |

*Example II*

Using cottonseed oil tests were made with different solvents. In each case an equal volume of solvent and oil is used at temperatures of about 25° C.

| Solvent | $BF_3$ | Time | Viscosity of polymerized oil at 210° F. |
|---|---|---|---|
| | Percent | | Seconds |
| Naphtha | 23 | 48 | 531 |
| $C_6H_5Cl$ | 8 | 48 | 1,070 |
| $C_2H_4Cl_2$ | 8 | 48 | 8,800 |
| $C_2H_3Cl_3$ | 8 | 48 | 10,000 |

*Example III*

The oily product of Example I obtained with the polymerization using boron fluoride had the following inspection:

Specific gravity ............................................. .9413 $\frac{29.4°}{15.5°}$
Viscosity at 210° F .......................................... 9500 sec.
Color ....................................................... 3 Rob.
Acid number ................................................. 5.1 mgs.
Saponification number ....................................... 178 mgs.

When added in the proportion of 5% to a mineral oil having a viscosity index of 98, it was found to have been raised to 117. 2% lowers pour of special gravity of Manchester spindle oil from 25 to +5° F. 2% lowers pour of pour point of FFF valve oil from 25 to −25° F.

In the above description the products are referred to as polymers which is the case at the preferred low temperatures, but at higher temperatures, approximately 100° C. or higher, there appears to be a loss of water and the process might be more strictly termed condensation. The polymers are thus different in many respects from other known polymers such as those produced from unsaturated oils by heating or by electrical treatment; for example, the iodine numbers are considerably lower.

The invention is not to be limited to any particular type of fatty oil nor to any particular catalyst, solvent, or method of conducting the reaction but only to the following claims in which it is desired to claim all novelty inherent in the invention.

We claim:

1. An improved process for polymerizing fatty oil comprising diluting a fatty oil of the class of the semi-drying oils with a halogenated gaseous hydrocarbon, adding boron fluoride to the oil, and polymerizing the mixture at a temperature of about 25° C. for a prolonged period and stopping the reaction before the polymer becomes insoluble, the catalyst being passed through the mixture while maintained at substantially room temperature.

2. The process for producing polymerized oils comprising diluting a semi-drying fatty oil with halogenated gaseous hydrocarbon diluent, adding boron fluoride thereto and polymerizing at substantially room temperature for a prolonged period, and stopping the reaction to obtain an oil soluble polymer.

3. The process for polymerizing fatty oil comprising diluting rapeseed oil with ethylene dichloride, adding boron fluoride thereto and polymerizing at substantially room temperature for a prolonged period, and stopping the reaction before gelation, whereby an oil soluble polymer is obtained.

4. An improved process for polymerizing fatty oil comprising diluting a fatty oil selected from the semi-drying oil class with a halogenated gaseous hydrocarbon, adding boron fluoride, polymerizing at a relatively low temperature of about 25° C., stopping the reaction before insoluble polymers are produced.

5. The process of polymerizing oils comprising diluting a semi-drying oil with ethylene dichloride, adding boron fluoride and polymerizing for a prolonged period at substantially room temperature, and stopping the reaction at a point where the polymer produced is soluble in oil.

6. A polymer of a semi-drying oil, light in color, miscible with mineral lubricating oil, having a viscosity above 1500 seconds Saybolt at 210° F. and having the property of reducing the pour point of waxy mineral oils when added thereto.

7. A lubricating composition comprising a mineral lubricating oil containing a polymer of a semi-drying oil dissolved therein, said polymer being light in color, having a viscosity above 1500 seconds Saybolt at 210° F., the polymer being further characterized by the property of reducing the pour point of waxy lubricating oils when added thereto.

8. An improved polymer of a semi-drying fatty oil having a viscosity above 1000 seconds at 210° F., soluble in mineral oil and having a substantially lower iodine number than the original oil from which it is prepared.

9. A lubricating composition according to claim 7 in which a waxy hydrocarbon oil is used, and the amount of the polymer is less than about 10% whereby the normal pour point is substantially reduced.

10. A lubricating composition according to claim 7 in which the polymer is added in an amount above about 10%, whereby the viscosity and viscosity index of the oil are substantially increased.

11. A lubricating composition comprising a mineral lubricating oil containing a polymer of a semi-drying oil dissolved therein, said polymer being of good color and odor and having a viscosity above 3000 seconds Saybolt at 210° F. and having an iodine number less than one half that of the oil from which it is prepared and being further characterized by the property of reducing the pour point of waxy lubricating oils when added thereto.

12. The process of producing oil-soluble polymerized oils comprising the steps of diluting a semi-drying fatty oil with a volatile hydrocarbon diluent, adding thereto boron fluoride as a polymerization catalyst, and polymerizing the mixture for a controlled time and at substantially room temperature sufficient to produce an oil-soluble polymer capable of increasing the viscosity of a hydrocarbon oil lubricant.

13. The process of producing oil-soluble polymerized oils comprising the steps of diluting a semi-drying fatty oil with a volatile hydrocarbon diluent, adding thereto aluminum chloride as a polymerization catalyst, and polymerizing the mixture for a controlled time and at substantially room temperature sufficient to produce an oil-soluble polymer capable of increasing the viscosity of a hydrocarbon oil lubricant.

14. The process of producing oil-soluble polymerized oils comprising the steps of diluting a semi-drying fatty oil with a volatile hydrocarbon diluent, adding thereto a polymerization catalyst of the group consisting of aluminum chloride and boron fluoride, and polymerizing the mixture for a controlled time and at substantially room temperature sufficient to produce an oil-soluble polymer capable of increasing the viscosity of a hydrocarbon oil lubricant,

ANTHONY H. GLEASON.
RAPHAEL ROSEN.